United States Patent
Guan et al.

(10) Patent No.: US 11,738,407 B2
(45) Date of Patent: Aug. 29, 2023

(54) HIGH-PRECISION AND HIGH-EFFICIENCY LASER POLISHING METHOD ORIENTED TO LARGE-SIZE ULTRA-THIN MASK PLATE

(71) Applicants: Beihang University, Beijing (CN); Tsinghua University, Beijing (CN)

(72) Inventors: Yingchun Guan, Beijing (CN); Zhen Zhang, Beijing (CN); Huaming Wang, Beijing (CN); Yuhang Li, Beijing (CN)

(73) Assignees: BEIHANG UNIVERSITY, Beijing (CN); TSINGHUA UNIVERSITY, Beijing (CN)

( * ) Notice: Subject to any disclaimer, the term of this patent is extended or adjusted under 35 U.S.C. 154(b) by 107 days.

(21) Appl. No.: 17/385,096

(22) Filed: Jul. 26, 2021

(65) Prior Publication Data

US 2022/0063022 A1 Mar. 3, 2022

(30) Foreign Application Priority Data

Sep. 1, 2020 (CN) .......................... 202010903620.1

(51) Int. Cl.
*B23K 26/352* (2014.01)
*B23K 26/03* (2006.01)

(52) U.S. Cl.
CPC .................. *B23K 26/3576* (2018.08)

(58) Field of Classification Search
CPC .................. B23K 26/3576; B23K 26/034
USPC .................................................. 219/121.66
See application file for complete search history.

(56) References Cited

U.S. PATENT DOCUMENTS

| 4,731,254 | A * | 3/1988 | Heineken | C03B 29/02 |
| | | | | 219/121.64 |
| 6,168,744 | B1 * | 1/2001 | Malshe | B23K 26/60 |
| | | | | 264/430 |
| 6,293,680 | B1 * | 9/2001 | Bruns | G02B 26/06 |
| | | | | 359/849 |
| 6,809,291 | B1 * | 10/2004 | Neil | B23K 26/0624 |
| | | | | 219/121.76 |
| 10,124,410 | B2 * | 11/2018 | Kanko | B23K 15/0013 |
| 10,428,415 | B2 * | 10/2019 | Park | G03F 7/12 |
| 10,898,969 | B2 * | 1/2021 | Kanko | B33Y 50/02 |
| 11,014,197 | B2 * | 5/2021 | Ji | B23K 26/0626 |

(Continued)

*Primary Examiner* — Eric S Stapleton
(74) *Attorney, Agent, or Firm* — Hickman Becker Bingham Ledesma LLP

(57) ABSTRACT

The present disclosure relates to a high-precision and high-efficiency laser polishing method oriented to a large-size ultra-thin mask plate, and belongs to the technical field of advanced laser manufacturing. A high-precision and high-efficiency laser polishing technology is applied to the surface smoothness improvement of the large-size ultra-thin mask plate. The high-precision and high-efficiency laser polishing method specifically comprises the four following steps: step one, selecting and placing an ultra-thin invar alloy mask plate on a five-axis machining platform; step two, adopting a nanosecond continuous laser, and setting a laser incident angle; step three, setting N laser polishing areas; and step four, performing laser polishing continuous splicing. Compared with the prior art, the surface smoothness of the mask plate is improved, the polishing efficiency is high, the precision is high, and the influence on the geometrical characteristic size of the appearance of an original mask plate is low.

2 Claims, 1 Drawing Sheet

(56) References Cited

U.S. PATENT DOCUMENTS

| | | | |
|---|---|---|---|
| 2005/0211163 A1* | 9/2005 | Li | B33Y 40/00 118/308 |
| 2009/0022951 A1* | 1/2009 | Nelissen | B23K 26/40 428/141 |
| 2010/0064538 A1* | 3/2010 | Scarsbrook | B23K 26/38 428/141 |
| 2012/0080418 A1* | 4/2012 | Sakamoto | B29C 66/91443 219/243 |
| 2014/0366928 A1* | 12/2014 | Niinobe | H01L 31/022441 136/246 |
| 2016/0318122 A1* | 11/2016 | Ota | B23K 26/402 |
| 2017/0120337 A1* | 5/2017 | Kanko | G01N 21/45 |
| 2017/0120377 A1* | 5/2017 | Webster | B23K 9/0956 |
| 2018/0169791 A1* | 6/2018 | Miller | B23K 26/3576 |
| 2018/0202035 A1* | 7/2018 | Park | C23C 14/042 |
| 2018/0297117 A1* | 10/2018 | Kanko | G01B 9/02091 |
| 2019/0193198 A1* | 6/2019 | Blair | B23K 26/352 |
| 2020/0030913 A1* | 1/2020 | Nariya | B23K 26/21 |

\* cited by examiner

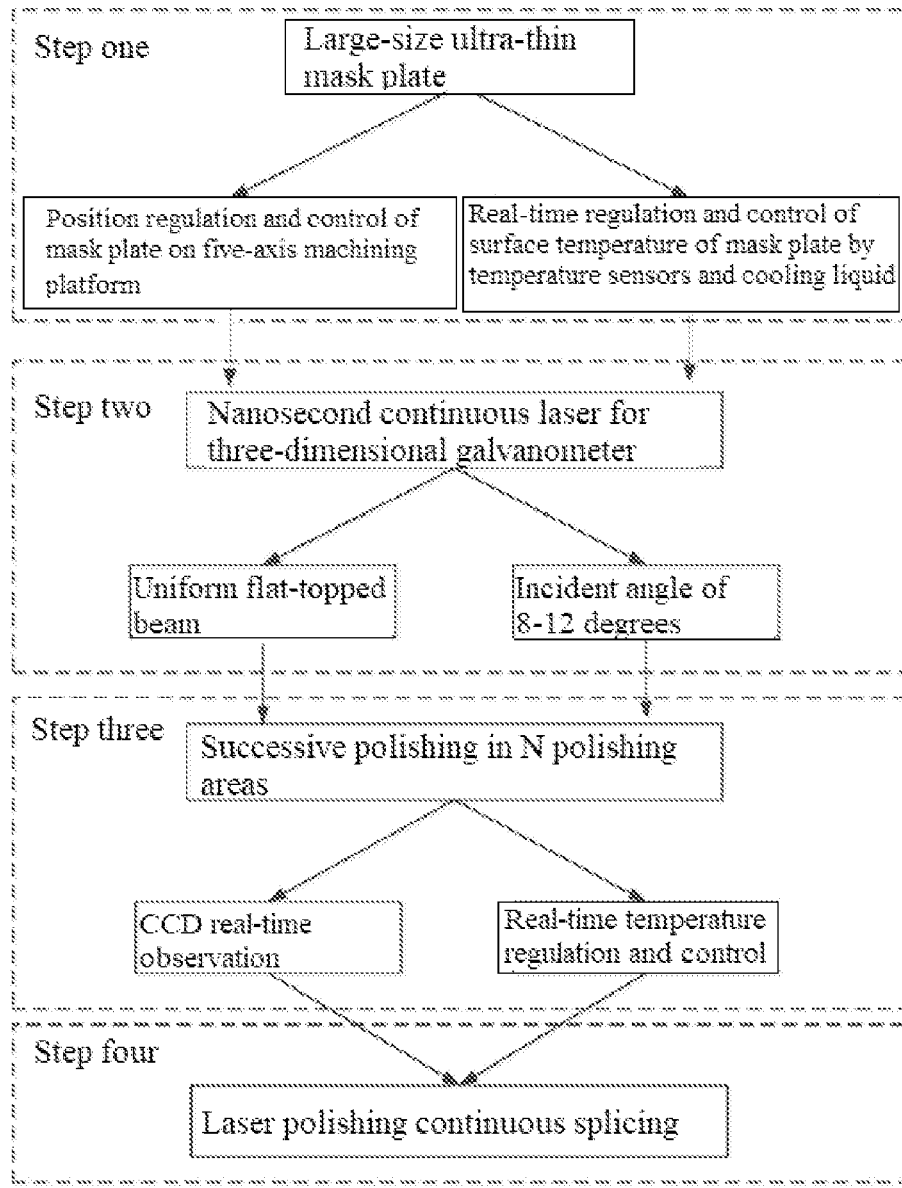

HIGH-PRECISION AND HIGH-EFFICIENCY LASER POLISHING METHOD ORIENTED TO LARGE-SIZE ULTRA-THIN MASK PLATE

CROSS REFERENCE TO RELATED APPLICATION(S)

This patent application claims the benefit of and priority to Chinese Patent Application No. 202010903620.1, filed on Sep. 1, 2020, the contents of which are incorporated by reference herein in their entirety as part of the present application.

TECHNICAL FIELD

The present disclosure belongs to the technical field of advanced laser manufacturing, and specifically relates to a high-precision and high-efficiency laser polishing method oriented to a large-size ultra-thin mask plate.

BACKGROUND

Mask plate is a graphic master plate used by a photoetching process commonly used in micro-nano machining technology, a mask graphic structure is formed by a non-transparent shading film on a transparent substrate, graphic information is transferred to a product substrate through an exposure process, and the mask plate is widely applied to the field of display panels in the industries of aerospace, automobile electronics, medical instruments, and the like.

In the manufacturing process of the mask plate, in order to eliminate rough scratches such as grinding, milling, electric spark and the like on the surface of the mask plate, surface polishing is an indispensable process. However, along with the increase of the size of the display panel and the increase of display requirements, more strict requirements are put forward on the size and surface precision of the mask plate, so that the polishing difficulty is further increased.

Due to the fact that a traditional polishing mode is mechanical contact polishing, mechanical damage is easily caused to the mask plate, or wrinkles can be formed even, and any defect on the mask plate can influence the precision of the final photoetching pattern. On the other hand, for the ultra-thin invar alloy mask plate, physical and chemical effects such as thermal fatigue, erosion, chemical corrosion and the like can be hard to avoid in the evaporation process. The main failure modes include abrasion failure, fracture failure, plastic deformation and the like. As a result, more strict requirements are further put forward for the forming and the nature formation of the ultra-thin invar alloy mask plate.

As a non-contact polishing technology, laser polishing is based on the thermodynamics and a rapid melting action mechanism of laser materials, by accurately controlling the rough surface of laser melting metal and optimizing the non-equilibrium solid-liquid vapor-phase transition, under the action of the gravity and surface tension of the molten material, without affecting the geometric dimension of the original material. The rough surface of the material becomes smooth, the surface smoothness of the material is improved, the automation degree is high, and the polishing efficiency is high. The technology has been used to solve the dependence of polishing metal matrix in traditional ways. It would be helpful to have a laser polishing method specifically for a large-size, ultra-thin mask plate.

SUMMARY

The present application discloses a high-precision and high-efficiency laser polishing method for a large-size ultra-thin mask plate. The method is high in polishing efficiency and precision, and the influence on the geometrical characteristic size of an original ultra-thin mask plate is small while the surface smoothness of the large-size ultra-thin mask plate is improved.

According to the high-precision and high-efficiency laser polishing method for a large-size ultra-thin mask plate, the technological process is as shown in FIG. 1, wherein a high-precision and high-efficiency laser polishing technology is applied to the surface smoothness improvement of the large-size ultra-thin mask plate.

Further, the method mainly comprises the following steps:

step one, selecting an ultra-thin invar alloy mask plate, and adopting a five-axis machining platform capable of translating along X axis, Y axis and Z axis and rotating along Z axis and Y axis, wherein the machining precision of the machining platform is 0.0005-0.001 mm, two to ten temperature sensors are mounted on the machining platform, temperature signals generated in the laser polishing process can be identified, cooling liquid outlets are formed in the X, Y and Z translation axes and the Z and Y rotation axes through rubber hoses simultaneously, and cooling liquid can regulate and control the temperature in the polishing process in real time;

step two, adopting a nanosecond continuous laser with the wavelength of 1065-1068 nm and the spot diameter of 850-1200 μm, wherein the nanosecond continuous laser is provided with a three-dimensional galvanometer, a laser beam is a square equally-distributed flat-topped beam, and simultaneously, an incident angle, with the mask plate, of the laser beam is always kept to be 8 degrees to 12 degrees;

step three, setting N laser polishing areas, wherein a second polishing area is polished after first laser polishing is finished, polishing is carried out successively in the same manner, the surface size of the mask plate is an integral multiple of the size of a single laser polishing area, the thickness change and the surface working condition of the mask plate are observed in real time by using charge coupled device (CCD) equipment, and meanwhile, temperature regulation and control are carried out in combination with the temperature sensors and the cooling liquid in the step one, so that the defects of stripe overlapping, wrinkling, ablation and air holes are avoided; and step four, adjusting the machining position of the mask plate in real time through the five-axis machining platform in the step one, performing laser polishing continuous splicing on the N polishing areas in the step three, and finishing laser polishing of the whole mask plate when the surface roughness of the mask plate is less than or equal to Ra 0.05 μm, the surface thickness deviation is 4-8 μm, and the thickness variation is 10-20 μm.

Wherein, the ultra-thin invar mask plate in the step one has length and width dimensions of more than 125 mm and 50 mm, respectively, and the average thickness is 50-180 μm.

The method has the following advantages:

firstly, the laser polishing technology is applied to the surface polishing of the large-size ultra-thin mask plate, without a mechanical abrasive material or a polishing tool, belongs to non-contact polishing, and can polish ultra-thin mask plates which cannot be polished by a traditional method;

secondly, on the basis of thermodynamics and a rapid melting action mechanism of laser materials, the polishing efficiency is high, the precision is high, the influence on the geometrical characteristic size of an original ultra-thin mask plate is small while the surface smoothness of the large-size ultra-thin mask plate is improved; and and thirdly, the method is simple, the polishing efficiency is high and can reach more than 400 cm$^2$/h, the precision is high, the automation degree is high, the method is green and environment-friendly, large-area and repeated machining of the ultra-thin mask plate can be realized, and industrial application is easy to realize.

BRIEF DESCRIPTION OF THE DRAWINGS

FIG. 1 is a process flow diagram of a method in the present disclosure.

DETAILED DESCRIPTION OF THE EMBODIMENTS

In order to preferably understand the content of the present disclosure, the technical scheme of the present disclosure is introduced in detail in combination with the following attached figures and specific embodiment, the examples are only intended to describe the present disclosure, but not intended to limit the scope of the present disclosure.

The embodiment takes the laser polishing of an invar alloy mask plate as an example, and a high-precision and high-efficiency laser polishing technology is applied to the surface smoothness improvement of a large-size ultra-thin mask plate, and the specific polishing flow, as shown in FIG. 1, mainly comprises the following steps:

step one, selecting an ultra-thin invar alloy mask plate with length and width dimensions of 200 mm and 100 mm, respectively, and the average thickness of 120 μm, and adopting a five-axis machining platform capable of translating along X axis, Y axis and Z axis and rotating along Z axis and Y axis, wherein the machining precision of the machining platform is 0.0005 mm, six temperature sensors are mounted on the machining platform, temperature signals generated in the laser polishing process can be identified, cooling liquid outlets are formed in the X, Y and Z translation axes and the Z and Y rotation axes through rubber hoses simultaneously, and cooling liquid can regulate and control the temperature in the polishing process in real time;

step two, adopting a nanosecond continuous laser with the wavelength of 1065 nm and the spot diameter of 1000 μm, wherein the nanosecond continuous laser is provided with a three-dimensional galvanometer, a laser beam is a square equally-distributed flat-topped beam, and simultaneously, an incident angle, with the mask plate, of the laser beam is always kept to be 10 degrees;

step three, setting eight laser polishing areas, wherein the polishing size of each polishing area is 50*50 mm to guarantee that the surface size of the mask plate is an integral multiple of a single laser polishing area, a second polishing area is polished after first laser polishing is finished, polishing is carried out successively in the same manner, the thickness change and the surface working condition of the mask plate are observed in real time by using CCD equipment, and meanwhile, temperature regulation and control are carried out in combination with the temperature sensors and the cooling liquid in the step one, so that the defects of stripe overlapping, wrinkling, ablation and air holes are avoided; and step four, adjusting the machining position of the mask plate in real time through the five-axis machining platform in the step one, performing laser polishing continuous splicing on the eight polishing areas in the step three, and finishing laser polishing of the whole mask plate when the surface roughness of the mask plate is less than or equal to Ra 0.05 μm, the surface thickness deviation is 4-8 μm, and the thickness variation is 10-20 μm.

The above embodiments of the present disclosure are intended to be illustrative of the present disclosure and are not intended to limit the embodiments of the disclosure, it is intended that any modification or improvement in the method, steps or conditions of the present disclosure also be considered in the scope of the present disclosure within the spirit and principle of the present disclosure.

What is claimed is:

1. A high-precision and high-efficiency laser polishing method oriented to a large-size ultra-thin mask plate, wherein a high-precision and high-efficiency laser polishing technology is applied to the surface smoothness improvement of the large-size ultra-thin mask plate, the method comprising:

step one, selecting an ultra-thin invar alloy mask plate, and adopting a five-axis machining platform capable of translating along X axis, Y axis and Z axis and rotating along Z axis and Y axis, wherein a machining precision of the machining platform is 0.0005-0.001 mm, two to ten temperature sensors are mounted on the machining platform, temperature signals generated in the laser polishing process can be identified, cooling liquid outlets are formed in the X, Y and Z translation axes and the Z and Y rotation axes through rubber hoses simultaneously, and cooling liquid can regulate and control the temperature in the polishing process in real time;

step two, adopting a nanosecond continuous laser with a wavelength of 1065-1068 nm and a spot diameter of 850-1200 μm, wherein the nanosecond continuous laser is provided with a three-dimensional galvanometer, a laser beam is a square equally distributed flat-topped beam, and simultaneously, an incident angle, with the mask plate, of the laser beam is kept to 8 degrees to 12 degrees;

step three, setting N laser polishing areas, wherein a second polishing area is polished after first laser polishing is finished, polishing is carried out successively in the same manner, a surface size of the mask plate is an integral multiple of a size of a single laser polishing area, a thickness change and a surface working condition of the mask plate are observed in real time by using charge coupled device (CCD) equipment, and temperature regulation and control are carried out in combination with the temperature sensors and the cooling liquid in the step one, so that the defects of stripe overlapping, wrinkling, ablation, and air holes are avoided; and step four, adjusting a machining position of the mask plate in real time through the five-axis machining platform in the step one, performing laser polishing continuous splicing on the N polishing areas in the step three, and finishing laser polishing of the whole mask plate when a surface roughness of the mask plate is less than or equal to Ra 0.05 μm, a surface thickness deviation is 4-8 μm and the thickness variation is 10-20 μm.

2. The high-precision and high-efficiency laser polishing method oriented to a large-size ultra-thin mask plate according to claim 1, wherein the ultra-thin invar mask plate in the step one has length and width dimensions of more than 125 mm and 50 mm, respectively, and the average thickness is 50-180 μm.

\* \* \* \* \*